(12) United States Patent
Kibele et al.

(10) Patent No.: US 12,339,147 B2
(45) Date of Patent: Jun. 24, 2025

(54) MAGNETIC-INDUCTIVE FLOWMETER

(71) Applicant: IFM Electronic gmbH, Essen (DE)

(72) Inventors: Matthias Kibele, Waldburg (DE); Patrick Werner, Stetten (DE); Marc Doehring, Aulendorf (DE); Markus Seitz, Friedrichshafen (DE)

(73) Assignee: IFM Electronic GmbH, Essen (DE)

( * ) Notice: Subject to any disclaimer, the term of this patent is extended or adjusted under 35 U.S.C. 154(b) by 249 days.

(21) Appl. No.: 17/971,975

(22) Filed: Oct. 24, 2022

(65) Prior Publication Data

US 2023/0130113 A1  Apr. 27, 2023

(30) Foreign Application Priority Data

Oct. 27, 2021  (DE) .......................... 102021127943.7

(51) Int. Cl.
*G01F 1/58* (2006.01)

(52) U.S. Cl.
CPC ............... *G01F 1/584* (2013.01); *G01F 1/58* (2013.01)

(58) Field of Classification Search
CPC .................................. G01F 1/58; G01F 1/584
See application file for complete search history.

(56) References Cited

U.S. PATENT DOCUMENTS

| 4,297,897 A * | 11/1981 | Young ..................... G01F 15/12 |
| | | 73/861.12 |
| 2008/0053241 A1* | 3/2008 | Kappertz ................ G01F 1/584 |
| | | 73/861.12 |
| 2014/0251025 A1 | 9/2014 | Rogers et al. |
| 2014/0322979 A1* | 10/2014 | Ikeda ................... H01H 37/764 |
| | | 439/620.29 |

FOREIGN PATENT DOCUMENTS

| DE | 10 2004 063 617 A1 | 6/2006 |
| DE | 10 2007 004 826 | 8/2008 |
| DE | 10 2007 004 827 | 8/2008 |
| DE | 10 2013 103 970 A1 | 11/2014 |
| WO | WO 2005/057140 A1 | 6/2005 |

* cited by examiner

*Primary Examiner* — Jonathan M Dunlap
*Assistant Examiner* — John M Royston
(74) *Attorney, Agent, or Firm* — Patent Technologies, LLC; Robert D. Gunderman, Jr.

(57) ABSTRACT

The invention relates to a magnetic-inductive flowmeter for measuring the flow of a flowing, conductive medium. The flowmeter has a measuring tube, a magnetic field generating device, two pin shaped measuring electrodes, insertion parts each having a through-hole through which the two measuring electrodes respectively extend, the measuring electrodes have at least in sections a non-circular cross section and the through-holes of the two insertion parts have a contour complementary thereto. The pin shaped measuring electrodes are at least partially provided with an external thread and a nut is respectively screwed thereon, by means of which the measuring electrodes and the associated insertion parts are respectively firmly connected to the measuring tube.

11 Claims, 3 Drawing Sheets

MAGNETIC-INDUCTIVE FLOWMETER

CROSS REFERENCE TO RELATED PATENT APPLICATIONS

This application claims priority to German Patent Application 102021127943.7 filed on Oct. 27, 2022 entitled "Magnetisch-induktives Durchflussmessgerät" (Magnetic-Inductive Flowmeter) by Matthias Kibele et al., the entire disclosure of which is incorporated herein by reference in its entirety.

BACKGROUND OF THE INVENTION

1. Field of the Invention

This invention relates generally to a flowmeter, and more specifically to a Magnetic-Inductive Flowmeter.

2. Description of Related Art

Magnetic-inductive flowmeters, the operation of which is based on the principle of electromagnetic induction (=Faraday induction), have been known for many years and are used extensively in industrial measurement technology. According to the law of induction, an electric field strength perpendicular to the direction of flow and perpendicular to the magnetic field is generated in a flowing medium which carries charge carriers and flows through a magnetic field. The law of induction is exploited in magnetic-inductive flowmeters by generating a magnetic field by means of a magnetic field generating device, which usually comprises two energized magnetic coils, wherein the magnetic field is guided at least partially through the measuring tube, wherein the generated magnetic field has at least one component which is perpendicular to the direction of flow. Within the magnetic field, each volume element of the flowing medium which moves through the magnetic field and has a certain number of charge carriers contributes with the field strength generated in this volume element to a measuring voltage that can be tapped via the electrodes.

Since the induced voltage tapped via the electrodes is proportional to the flow velocity of the medium averaged over the cross-section of the measuring tube, the volumetric flow can be determined directly from the measured voltage if the diameter of the measuring tube is known. The only prerequisite for the use of a magnetic-inductive flowmeter is a minimum conductivity of the medium. In addition, it must be ensured that the measuring tube is filled with the medium at least to such an extent that the level of the medium is above the measuring electrodes.

Such measuring devices are known, for example from the German patent specifications DE 10 2007 004 827 B4 and DE 10 2007 004 826 B4, and are essentially characterized in that the magnetic coils and the electrodes are arranged directly at or in the wall of the measuring tube.

To avoid a short circuit between the two measuring electrodes, the measuring tube is made of a non-conductive material, typically PFA, PP or PTFE. A challenge in mounting the measuring electrodes in this plastic tube has arisen with respect to preventing them from spinning, since the frictional force between the plastic and the electrode head is usually insufficient to be able to tighten a nut. Therefore, it was necessary to counterhold the electrode usually with another tool while screwing on the nut.

In the related art, various possibilities for fastening and arranging the electrodes of an magnetic-inductive flowmeter are known. DE 102013 103 970 A1 discloses a multi-part electrode anchorage for fastening a measuring electrode in order to securely fasten it to the measuring tube even at high medium pressures above 50 bar. DE 10 2004 063 617 A1 discloses the arrangement of the measuring electrodes in such a way that the effective surface for tapping the induced voltage is essentially not the end face of an electrode, for example in the form of a pin, but its side face, so that a larger effective electrode surface for tapping the induced voltage is achieved.

It is an object of the invention to facilitate the assembly of a magnetic-inductive flowmeter and, in particular, the mounting of the measuring electrodes in the measuring tube.

The object is achieved according to the invention by a magnetic-inductive flowmeter with the features of claim 1 and further described herein. Advantageous embodiments of the invention are provided in the subclaims and further described herein.

BRIEF SUMMARY OF THE INVENTION

A magnetic-inductive flowmeter for measuring the flow of a flowing, conductive medium, the magnetic-inductive flowmeter comprising: a measuring tube comprising a non-conductive material; a magnetic field generating device for generating a magnetic field passing through the measuring tube perpendicular to the longitudinal axis of the measuring tube; and two pin-shaped measuring electrodes for tapping a measuring voltage induced in the flowing medium; wherein the measuring electrodes are arranged along a connecting line extending perpendicular to the longitudinal axis of the measuring tube and perpendicular to the magnetic field direction; wherein insertion parts are arranged opposite to each other at the measuring tube at its outer side; wherein the insertion parts each comprise a through-hole through which the two measuring electrodes respectively extend; wherein the measuring electrodes have at least in sections a non-circular cross-section and the through-holes of the two insertion parts have a contour complementary thereto; and wherein the pin-shaped measuring electrodes are at least partially provided with an external thread and a nut is respectively screwed thereon, by means of which the measuring electrodes and the associated insertion parts are respectively firmly connected to the measuring tube.

BRIEF DESCRIPTION OF THE DRAWINGS

The invention is explained by way of example with reference to the attached drawings based on preferred exemplary embodiments, wherein the features shown below both individually and in combination may represent an aspect of the invention. In the drawings.

Figure 1:
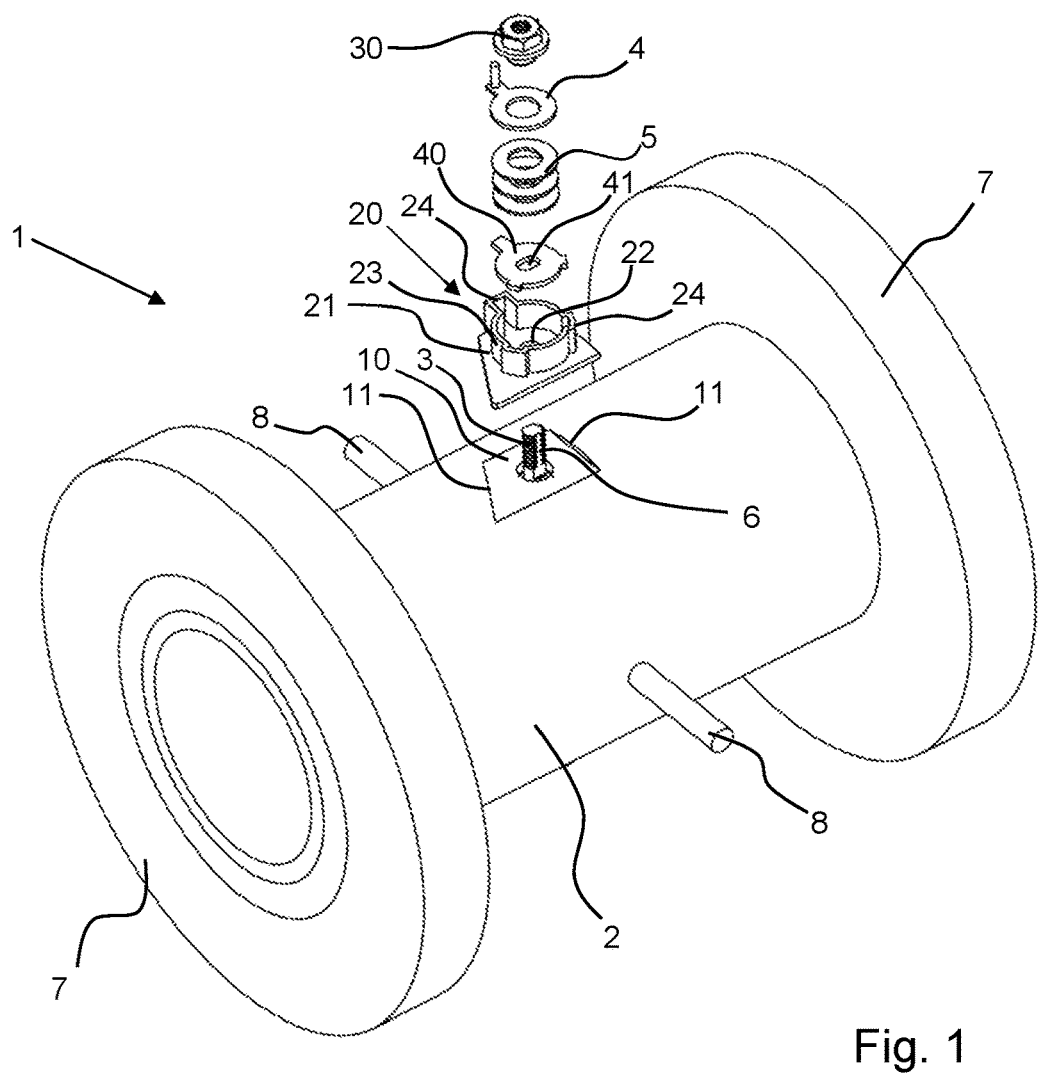
FIG. 1 depicts a first embodiment of a magnetic-inductive flowmeter comprising the anti-turn device according to the invention in an exploded view.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this, specification and the attached drawings and claims.

DESCRIPTION OF THE PREFERRED EMBODIMENTS

For a general understanding of the present invention, reference is made to the drawings. The present invention will be described by way of example, and not limitation. Modifications, improvements and additions to the invention described herein may be determined after reading this specification and viewing the accompanying drawings; such modifications, improvements, and additions being considered included in the spirit and broad scope of the present invention and its various embodiments described or envisioned herein.

The present invention relates to a Magnetic-Inductive Flowmeter.

According to the invention, respective insertion parts are arranged opposite to each other at the measuring tube at its outer side. The insertion parts each comprise a through-hole through which the two measuring electrodes respectively extend. The measuring electrodes have at least in sections a non-circular cross-section and said through-holes in the two insertion parts have a complementary contour thereto. Finally, an external thread is provided at least partially at the measuring electrodes and a nut is respectively screwed onto this external thread, so that the measuring electrodes and the associated insertion parts are respectively firmly connected to the measuring tube.

An advantageous further development of the invention provides that the measuring tube comprises respective flat depressions arranged opposite to each other at its outer side. These depressions are positioned on the measuring tube in such a way that they are respectively penetrated orthogonally by the two measuring electrodes. Furthermore, an insertion part is arranged in each of the depressions.

Another advantageous further development of the invention provides that the insertion parts arranged in the depressions each have a base surface which is complementary to the contour of the depression. As a result, at least in the longitudinal direction of the measuring tube, two stops are formed respectively, by means of which the insertion part arranged in each depression is fixed axially with respect to the longitudinal direction of the measuring tube.

Advantageously, the flat depressions and accordingly the base surfaces of the insertion parts each have a rectangular contour, but preferably they have at least an angle which is less than 90°. In this way, the circumference and thus the contacting abutting surfaces can be increased without having to increase the base surfaces of the depressions or the insertion parts.

Another advantageous further development of the invention provides that a substantially cylindrical structure is respectively arranged on the base surfaces of the insertion parts, in the center of which structure the through-hole is located and the circumference of which has at least one outwardly directed extension. This design is particularly advantageous if a disc is respectively arranged between the insertion part and the nut, which disc also has a through-hole complementary to the non-circular cross-section of the measuring electrodes, through which the two measuring electrodes respectively extend, and which also comprises at least one outwardly directed extension which is complementary to the circumference of the cylindrical structure of the insertion part. If a disc of complementary design to the outwardly directed extension is engaged therewith, this offers the advantage that in this case even greater torques can be transmitted. Further outwardly directed extensions would be advantageous to better transfer the torque from the cylindrical structure to the base surface of the insertion part.

In the sense of the invention, the term "disc" should also be understood to include a turning-milling part with a somewhat thicker or higher configuration than that of a typical disc.

As an alternative to the outwardly directed extension, the disc can also have an edge-shaped contour, in particular a design as a square or hexagon. Accordingly, the insertion parts also have an edge-shaped, in particular a square- or hexagonal-shaped, contour complementary thereto.

In order to make electrical contact with the electrodes, i.e. to tap the induced voltage, it is preferably provided that a disc-shaped plug contact is arranged respectively between the insertion part and the nut.

Another advantageous further development provides that a spring element is respectively arranged between the insertion part and the nut. The spring element, preferably in the form of a disk spring, is pretensioned when the nut is screwed on. This defined pretension ensures that the surface pressure required for the sealing between the electrode head and the plastic measuring tube is guaranteed at the inside of the measuring tube.

Another advantageous further development provides that the external thread of the measuring electrodes is interrupted in the circumferential direction by at least one recessed facet. In this way, the non-circular cross-section of the measuring electrodes required for the invention is achieved in a simple manner.

The basic idea of the invention is quasi to transfer the torque generated during the screwing on of the nut to the measuring tube in several intermediate steps. First, the torque is transmitted from the nut to the measuring electrode, which, due to its non-circular cross-section, transfers it to the insertion part with its through-hole formed complementary to the cross-section of the measuring electrode. Via the insertion part, the torque is finally transmitted to the measuring tube. If, advantageously, the insertion parts arranged in the depressions each have a base surface complementary to the contour of the depression and the insertion part is axially fixed at least in the longitudinal direction of the measuring tube by the two stops, the torque is absorbed accordingly by the measuring tube via said stops without causing any spinning. Without these two stops, the insertion part would simply have to be fixed by hand during tightening of the nut, if necessary. In both cases, the torque acting on the measuring tube and the overall assembly effort are significantly reduced by the now larger base surface of the insertion part compared to the electrode cross-section.

It is therefore no longer necessary to counterhold the electrode above the nut during assembly and thus secure it against rotation. The electrode pins can therefore now be designed significantly shorter and quasi flush with the nut, for example.

In the further description of the preferred embodiments, identical reference symbols denote identical or comparable components.

FIG. 1 shows a magnetic-inductive flowmeter 1 comprising an uncovered measuring tube 2, two flanges 7 for connection to a pipeline, two threaded pins 8 on which the magnetic field generating device required for the flow measurement is mounted, and one of two pin-type measuring electrodes 3. The structure basically required for the anti-turn device according to the invention and for fixing the electrode 3 to the measuring tube 2 is shown in an exploded view. Even though only one measuring electrode 3 comprising the anti-turn device is shown in FIG. 1, this, of course, also applies to the second measuring electrode on the opposite side of the measuring tube 2, which is concealed in the drawing.

Figure 4:
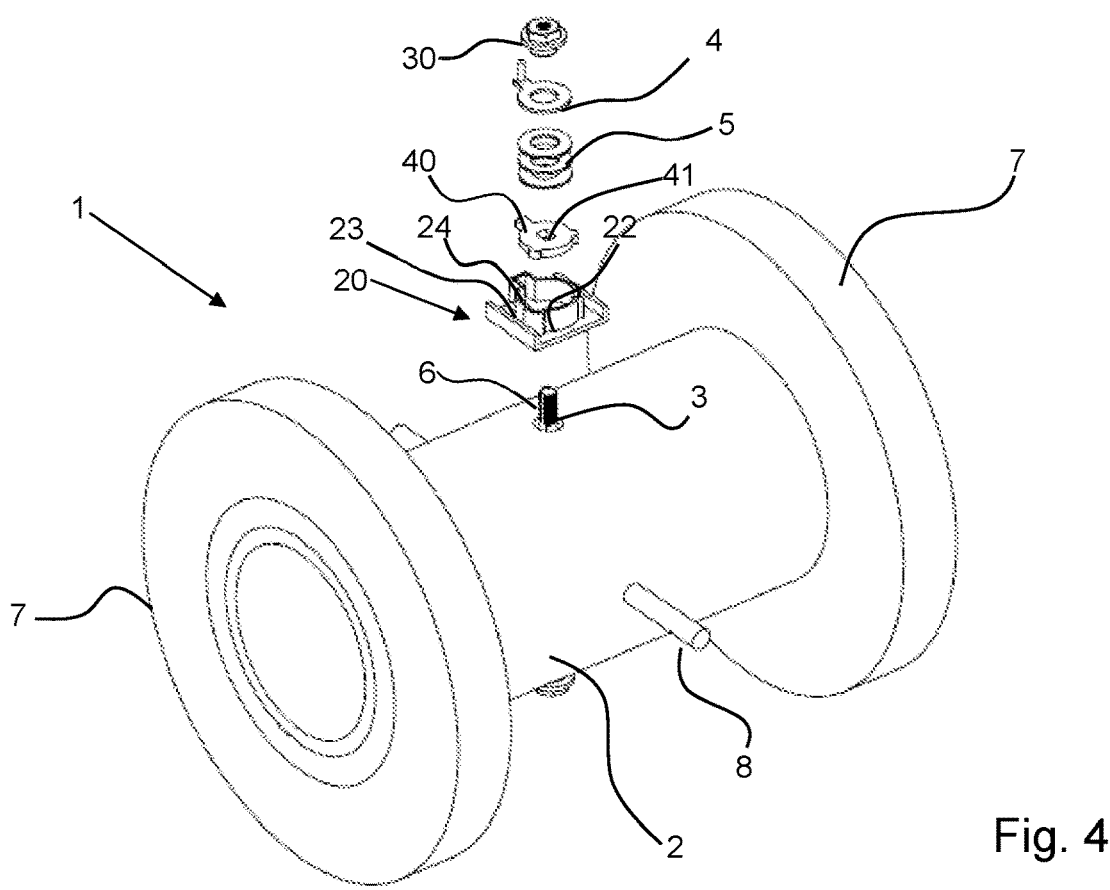
FIG. 4 depicts a second embodiment of a magnetic-inductive flowmeter comprising the anti-turn device according to the invention in an exploded view.
Figure 5:
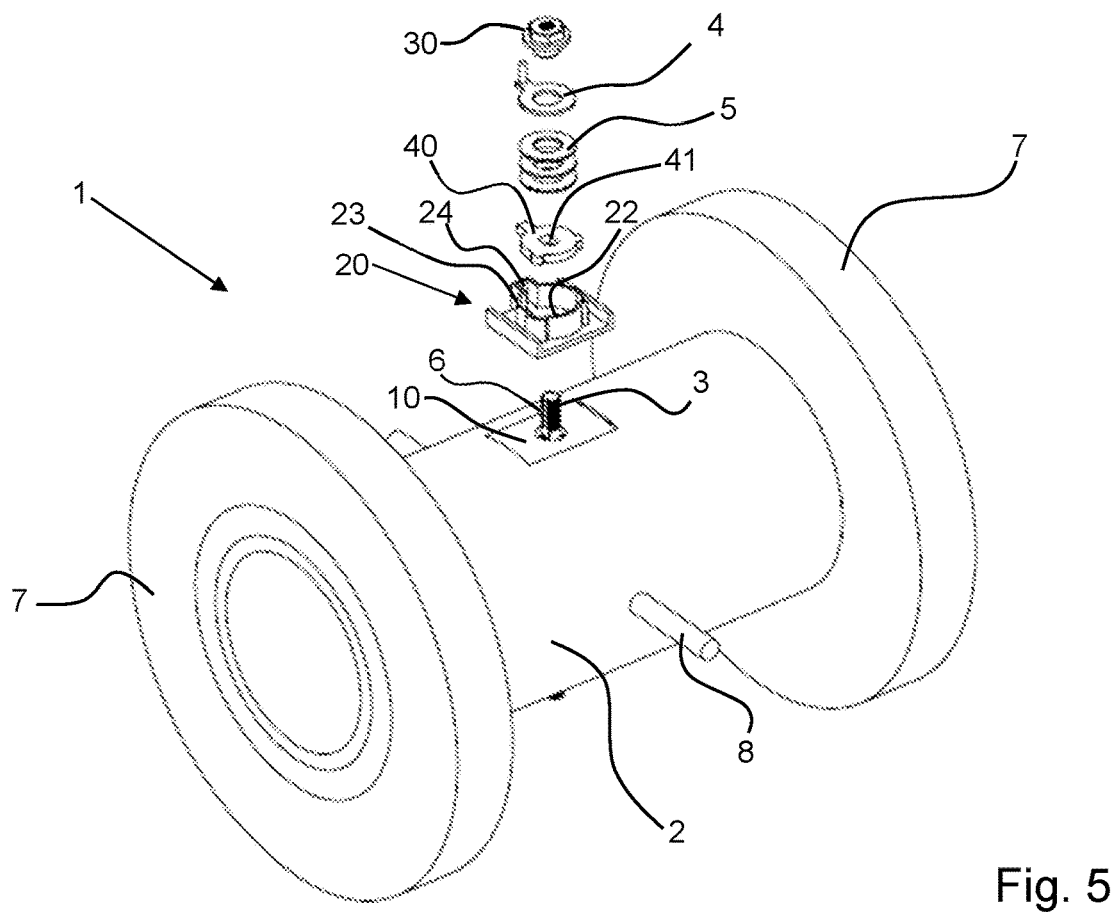
FIG. 5 depicts a third embodiment of a magnetic-inductive flowmeter comprising the anti-turn device according to the invention in an exploded view.

The basis of the anti-turn device in the present case is a flat depression 10 on the outside of the measuring tube 2, although in principle a version without depression 10 is also conceivable (see FIG. 4). This depression 10 is positioned on the measuring tube 2 so that it is penetrated orthogonally by the measuring electrode 3. An insertion part 20, the base surface of which has a contour which is designed complementary to the contour of the depression, is inserted into the depression 10. Two stops 11 are obtained by the depression 10, at least in the longitudinal direction of the measuring tube 2, by means of which depressions the insertion part 20 arranged in the depression 10 is fixed axially with respect to the longitudinal direction of the measuring tube 2. Depending on how deep the depression 10 is designed, stops can also be formed in the transverse direction. Advantageously, the contour of the depression 10 is not rectangular, but at least one angle is smaller than 90°. In this way, the circumference and thus the contacting abutting surfaces can be increased without having to increase the base surface of the depression 10 and the insertion part 20.

The insertion part 20 comprises a through hole 22, which is only partially visible in FIG. 1. The measuring electrode 3 extends through this through-hole 22 in the assembled state. The measuring electrode 3 must have a non-circular cross-section in the area of the through-hole 22, which was realized in FIG. 1 in that an external thread of the measuring electrode 3 is interrupted in the circumferential direction by a recessed facet 6. According to the non-circular cross-section of the measuring electrode 3, the through-hole 22 in the insertion part 20 has a contour complementary thereto.

The insertion part 20 is further characterized in that a substantially cylindrical structure 23 is placed on the base surface 21. In the center of this structure 23 the through hole 22 is disposed. The circumference of the structure 23 is characterized by three outwardly directed extensions 24, one of which is slightly larger than the other two.

In this special contour with the three extensions 24, a disc 40 is arranged which also comprises a through bore 41 complementary to the non-circular cross-section of the measuring electrode 3 and which also comprises three outwardly directed extensions complementary to the contour of the cylindrical structure 23 of the insertion part 20. This then allows even greater torques to be transmitted.

A spring element 5 is placed on the disc 40 on the measuring electrode 3. The spring element 5, in this case designed as a disk spring, ensures by means of a certain pretension that a surface pressure required for the sealing between the electrode head and the plastic measuring tube is ensured inside the measuring tube 2.

In order to make electrical contact with the measuring electrode 3. i.e. to tap the induced voltage, moreover, a disc-shaped plug contact 4 is placed on the measuring electrode 3.

Finally, a nut 30 is screwed onto the external thread of the measuring electrode 3, so that the measuring electrodes 3 as well as the intermediate elements insertion part 20, disc 40, spring element 5 and plug contact 4 are respectively firmly connected to the measuring tube 3.

While the nut 30 is screwed on, the resulting torque is transmitted to the measuring tube 3 in several intermediate steps. First, the torque is transmitted from the nut 30 to the measuring electrode 3, which, due to its non-circular cross-section, transfers it to the insertion part 20 with its through hole 22 which is complementary to the cross-section of the measuring electrode 3. Due to the disc 40 and the engagement of the three outwardly directed extensions in the corresponding counterparts of the cylindrical structure 23 of the insertion part 20, the torque is transmitted not only via the through bore 22, but additionally also via these outwardly directed extensions 24. Since the insertion part 20 is fixed at least in the longitudinal direction of the measuring tube 3 by the two stops 11, the torque is finally transmitted to the measuring tube 3. Due to the now larger base surface 21 of the insertion part 20 compared to the electrode cross-section, the torque acting on the measuring tube 3 is significantly reduced and can be absorbed accordingly by the measuring tube 3 via the stops 11 without causing any spinning.

Figure 2:
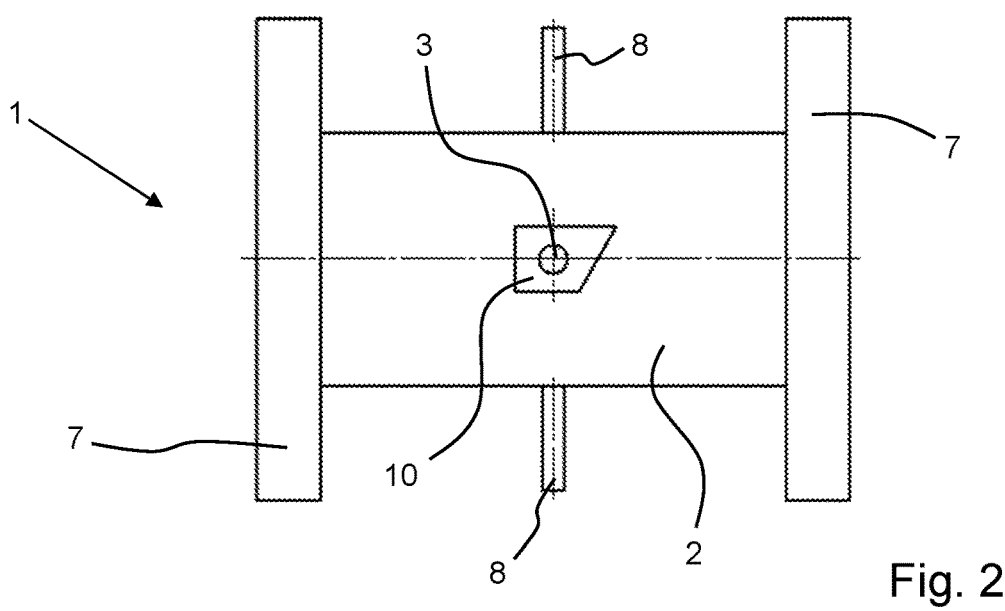
FIG. 2 depicts a side view of the magnetic-inductive flowmeter shown in FIG. 1 without the anti-turn device according to the invention.

FIG. 2 shows the magnetic-inductive flowmeter 1 according to the invention, comprising the measuring tube 2, the two flanges 7, the electrode 3 in the center in the flat depression 10 and the two threaded pins 8 for the magnetic field generating device projecting radially, in a side view without the anti-turn device according to the invention.

Figure 3:
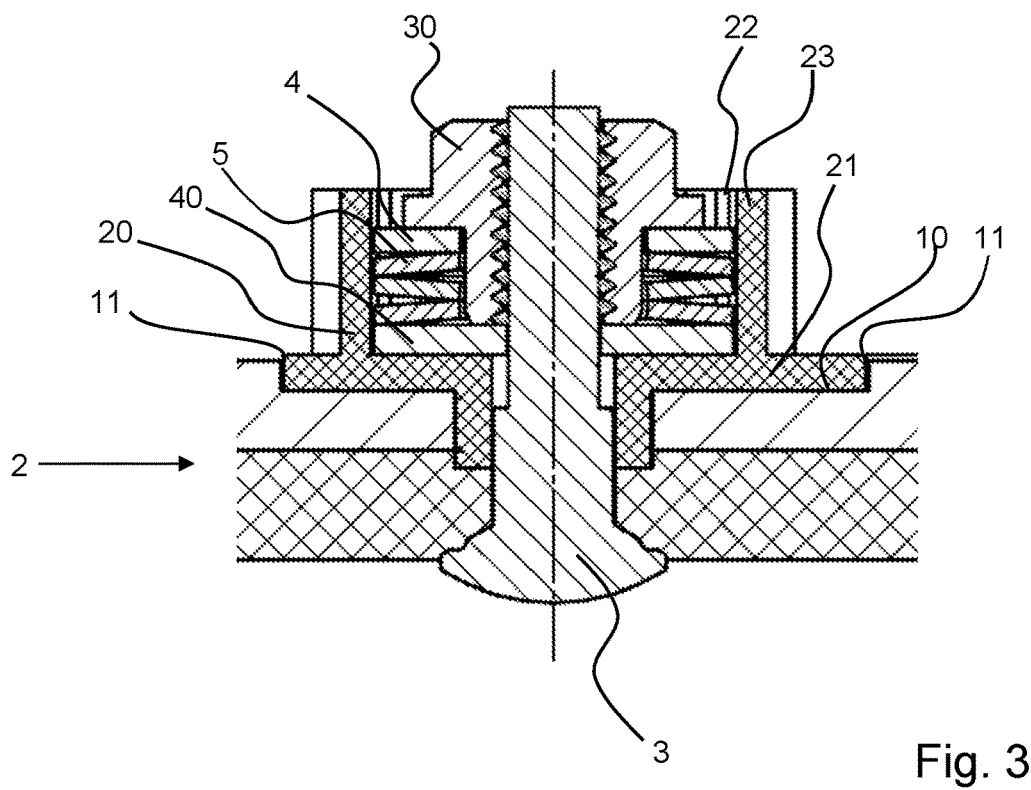
FIG. 3 illustrates a sectional view of the anti-turn device according to the invention from FIG. 1.

FIG. 3 shows a sectional view of the anti-turn device according to the invention, so that it can be seen how the structure shown in an exploded view in FIG. 1 looks in the assembled state. It can be seen how the measuring electrode 3 extends through the measuring tube 2, how the insertion part 20 is inserted in the flat depression 10 at the upper side of the measuring tube 2 acting quasi as a foundation for the entire structure, and how the individual elements disc 40, spring element 5, plug contact 4 and nut 40 are arranged in relation to one another within the cylindrical structure 23 of the insertion part 20.

FIG. 4 shows an exemplary embodiment without a depression 10 in the measuring tube 2. Everything else is insofar identical, so that reference is made to the description of FIG. 1 in order to avoid repetitions.

Figure 6:
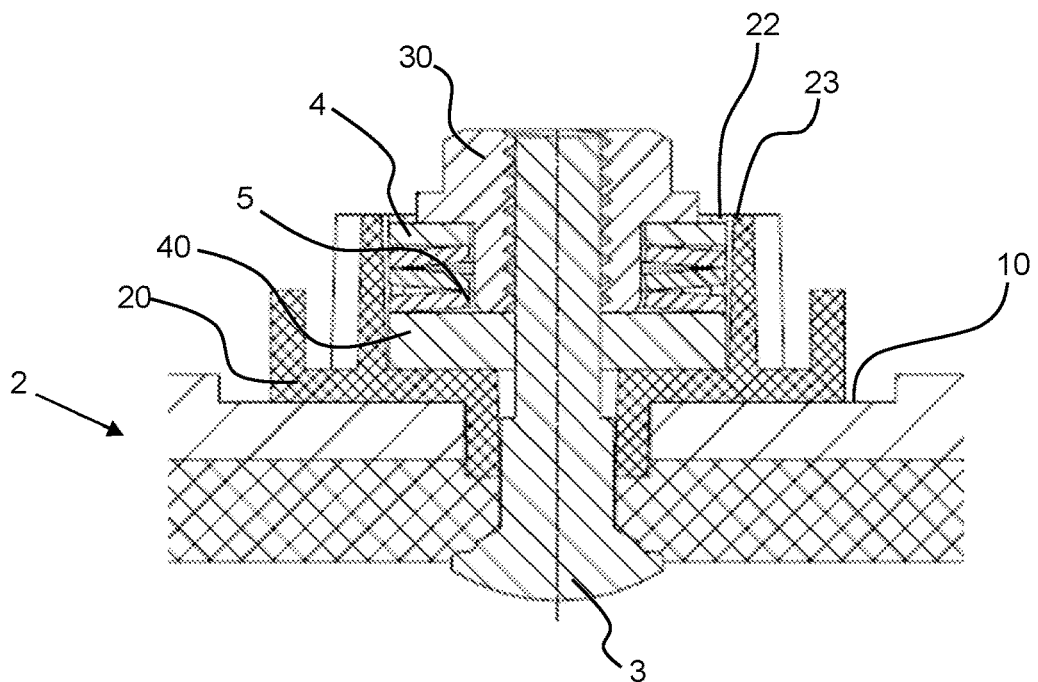
FIG. 6 illustrates a sectional view of the anti-turn device according to the invention from FIG. 5.

Figures S and 6 show a further exemplary embodiment of the invention. The essential structure corresponds to that of the preceding figures, so that reference is made thereto in order to avoid repetitions. The difference is that the depression 10 and the base surface of the insertion part 20 do not comprise contours complementary to each other. As a result, no stops 11 are then formed in the longitudinal direction of the measuring tube 2, as can be seen from FIG. 6. During tightening of the nut 30, the insertion part 20 would then have to be fixed simply by hand, if necessary. For this purpose, the insertion part 20 advantageously comprises a circumferential rim by means of which the manual fixing can be carried out.

In both embodiments, the torque acting on the measuring tube 2 is significantly reduced by the now larger base surface of the insertion part 20 compared to the electrode cross-section, and the measuring electrodes 3 can be easily mounted in the measuring tube 2 despite the compact design.

LIST OF REFERENCE SYMBOLS 1 magnetic-inductive flowmeter
2 measuring tube 3 measuring electrode
4 plug contact
5 spring element
6 facet
7 flange
8 threaded pin
10 flat depression
11 stop
20 insertion part
21 base surface
22 through hole
23 cylindrical structure
24 outwardly directed extension
30 nut
40 disc
41 through hole While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification and the attached drawings and claims.

What is claimed is:

1. A magnetic-inductive flowmeter for measuring the flow of a flowing, conductive medium, the magnetic-inductive flowmeter comprising:
    a measuring tube comprising a non-conductive material;
    a magnetic field generating device for generating a magnetic field passing through the measuring tube perpendicular to the longitudinal axis of the measuring tube; and
    two pin-shaped measuring electrodes for tapping a measuring voltage induced in the flowing medium;
    wherein the measuring electrodes are arranged along a connecting line extending perpendicular to the longitudinal axis of the measuring tube and perpendicular to the magnetic field direction;
    wherein insertion parts are arranged opposite to each other at the measuring tube at its outer side;
    wherein the insertion parts each comprise a through-hole through which the two measuring electrodes respectively extend;
    wherein the measuring electrodes have at least in sections a non-circular cross-section and the through-holes of the two insertion parts have a contour complementary thereto; and
    wherein the pin-shaped measuring electrodes are at least partially provided with an external thread and a nut is respectively screwed thereon, by means of which the measuring electrodes and the associated insertion parts are respectively firmly connected to the measuring tube.

2. The magnetic-inductive flowmeter according to claim 1,
    wherein the measuring tube is provided on its outer side with respective flat depressions arranged opposite to each other, which are respectively penetrated orthogonally by the two measuring electrodes; and
    an insertion part is respectively arranged in the depressions.

3. The magnetic-inductive flowmeter according to claim 2,
    wherein an insertion part comprising a base surface complementary to the contour of the depression is arranged in each of the depressions, so that two stops are formed at least in the longitudinal direction of the measuring tube, by means of which the insertion parts are fixed axially with respect to the longitudinal direction of the measuring tube.

4. The magnetic-inductive flowmeter according to claim 3,
    wherein the flat depressions and accordingly the base surfaces of the insertion parts each have a rectangular contour.

5. The magnetic-inductive flowmeter according to claim 3,
    wherein flat depressions and accordingly the base surfaces of the insertion parts each have a contour with at least one angle smaller than 90°.

6. The magnetic-inductive flowmeter according to claim 1,
    wherein a substantially cylindrical structure is respectively arranged on the base surfaces of the insertion parts, in the center of which structure the through-hole is located and the circumference of which structure has at least one outwardly directed extension or an edge-shaped, in particular a square- or hexagonal-shaped, contour.

7. The magnetic-inductive flowmeter according to claim 6,
    wherein a disc is respectively arranged between the insertion part and the nut, which disc likewise has a through-hole complementary to the non-circular cross-section of the measuring electrodes, through which through-hole the two measuring electrodes respectively extend, and which disc also comprises at least one outwardly directed extension complementary to the circumference of the cylindrical structure of the insertion part.

8. The magnetic-inductive flowmeter according to claim 6,
    wherein a disc is respectively arranged between the insertion part and the nut, which disc likewise has a through-hole complementary to the non-circular cross-section of the measuring electrodes, through which through-hole the two measuring electrodes respectively extend, and which disc also has an edge-shaped, in particular a square- or hexagonal-shaped, contour complementary to the circumference of the cylindrical structure of the insertion part.

9. The magnetic-inductive flowmeter according to claim 1,
    wherein a disc-shaped plug contact for making electrical contact with the measuring electrode is respectively arranged between the insertion part and the nut.

10. The magnetic-inductive flowmeter according to claim 1,
    wherein a spring element is respectively arranged between the insertion part and the nut.

11. The magnetic-inductive flowmeter according to claim 1,
    wherein the external thread of the measuring electrodes is interrupted in the circumferential direction by at least one recessed facet.

* * * * *